United States Patent [19]

Kress et al.

[11] Patent Number: 4,761,108
[45] Date of Patent: Aug. 2, 1988

[54] LOW PROFILE SLAB CARRIER

[75] Inventors: Edward S. Kress; Dennis R. Thomas; William L. LaBerdia, all of Brimfield, Ill.

[73] Assignee: Kress Corporation, Brimfield, Ill.

[21] Appl. No.: 9,819

[22] Filed: Feb. 2, 1987

[51] Int. Cl.⁴ .............................................. B60P 3/00
[52] U.S. Cl. .................................. 414/460; 280/43.23; 280/156; 280/490 R
[58] Field of Search .................. 414/458, 459, 460; 180/24.01; 280/99, 156, 157, 43.23, 425 R, 490 R, 91, 103

[56] References Cited

U.S. PATENT DOCUMENTS

| | | | |
|---|---|---|---|
| 996,323 | 6/1911 | Farney | 280/99 |
| 1,121,382 | 12/1914 | Leonard | 280/91 X |
| 3,454,123 | 7/1969 | Lewis | 280/91 X |
| 4,170,434 | 10/1979 | Kress et al. | 414/459 |
| 4,286,915 | 9/1981 | LaBerdia | 414/460 |
| 4,488,848 | 12/1984 | Kress et al. | 414/460 |
| 4,618,307 | 10/1986 | Kress et al. | 280/43.23 X |

FOREIGN PATENT DOCUMENTS 683945 6/1979 U.S.S.R. .............................. 414/459

Primary Examiner—Robert J. Spar
Assistant Examiner—Stuart J. Millman
Attorney, Agent, or Firm—Leydig, Voit & Mayer

[57] ABSTRACT

A heavy duty slab carrier for lifting and transporting a stack of steel slabs or the like is provided including a self-propelled tractor and a trailer having a longitudinally extending frame supported in front by a tractor hitch and at the rear by a rear wheel assembly having at least two steerable tandemly arranged wheels on each side of the trailer, a plurality of hydraulically controlled tong arms extending downwardly from the trailer frame for gripping a stack of slabs, hydraulic cylinders for raising and lowering the trailer frame and tong arms relative to the tractor and rear wheel assembly, and an arrangement of steering links and a hydraulic actuator for steering the tandemly arranged wheels of the rear wheel assembly in opposite directions.

9 Claims, 2 Drawing Sheets

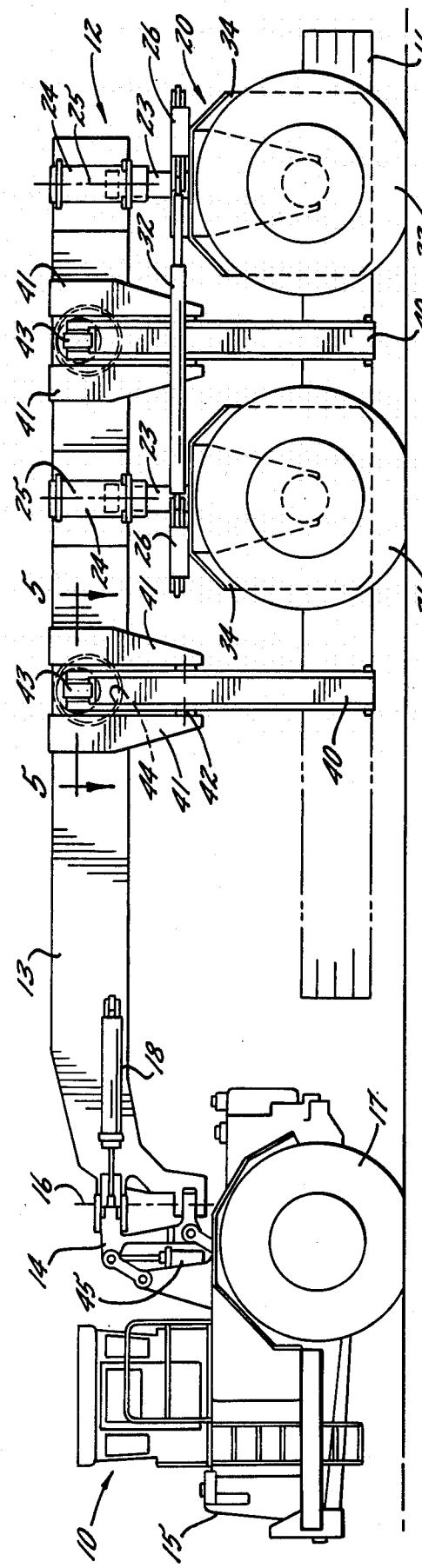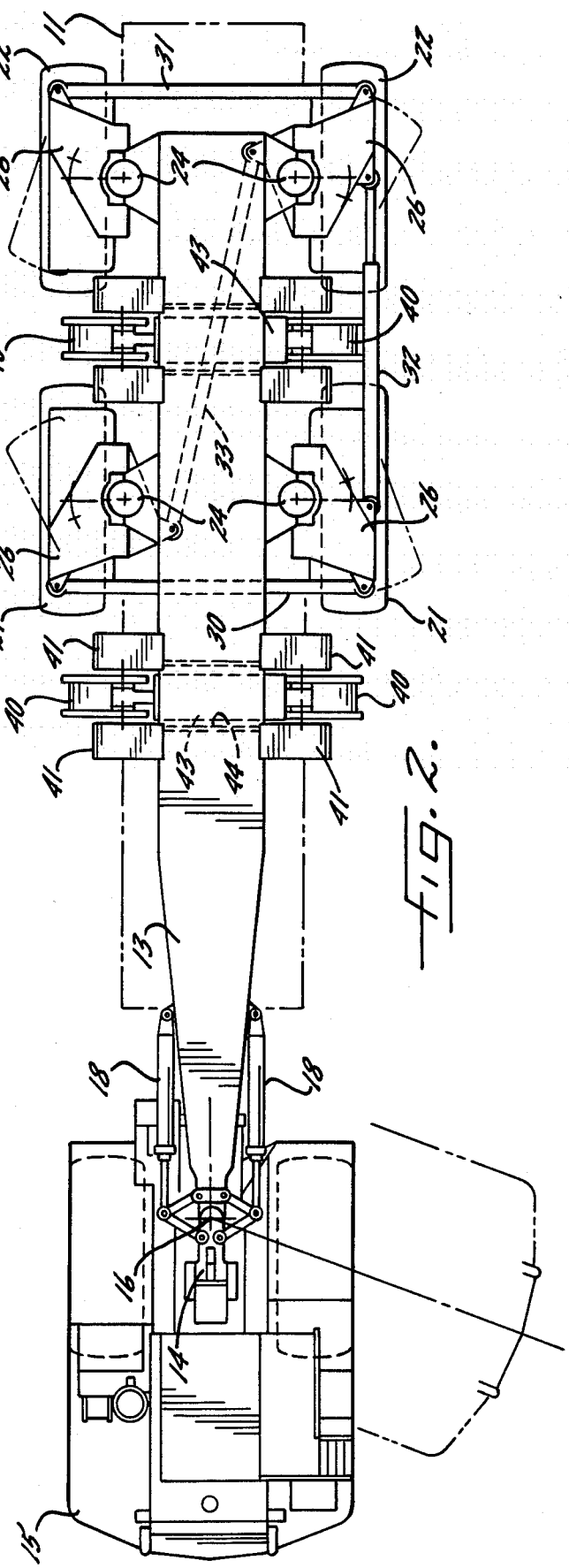

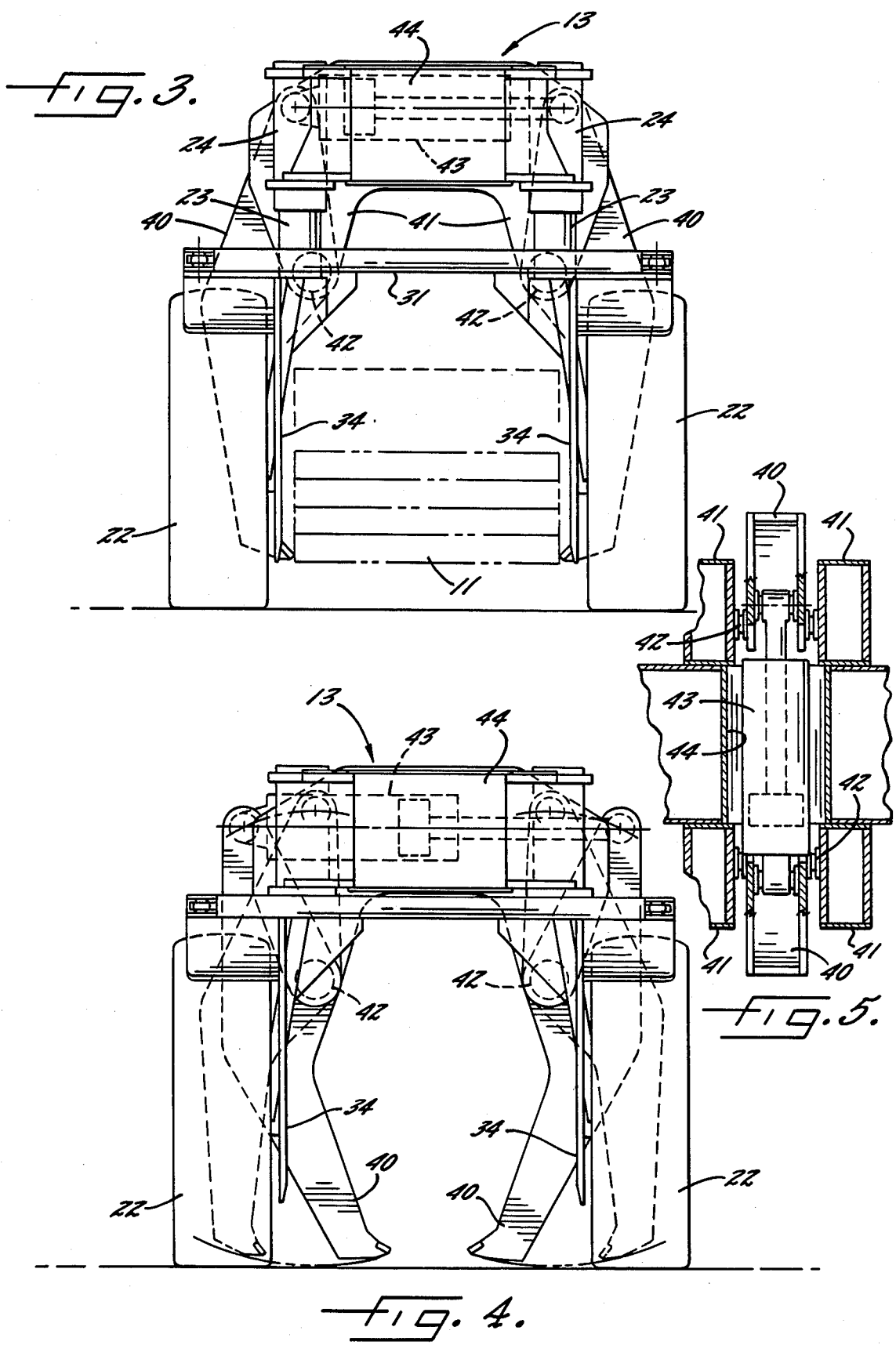

LOW PROFILE SLAB CARRIER

FIELD OF THE INVENTION

The present invention relates generally to load carrying vehicles and more particularly concerns a low profile carrier capable of lifting and transporting a heavy load such as a number of stacked steel slabs or the like.

BACKGROUND OF THE INVENTION

In U.S. Pat. Nos. 4,170,434; 4,286,915 and 4,488,848, there are disclosed various forms of carriers capable of lifting and transporting a stack of slabs which might weigh on the order of 50 to 200 tons.

Such carriers typically operate in and around steel mills transporting steel slabs between processing sites. In order to reduce the needed number of round trips, it is desirable to maximize the carrying capacity of the carrier. As the carrying capacity increases, however, larger tires must be used, necessarily increasing the carrier width, and similarly, the members which lift and support the load must be strengthened, thereby increasing the carrier height. The added height and width would pose no difficulty were there unlimited space within which to operate the carrier. Such carriers, however, are operated within an environment that often has limited overhead height clearance. In addition, a common job for such a carrier is to transport slabs to and from a field storage yard where stacks of in-process slabs are temporarily stored side-by-side and very close to one another in order to maximize yard space utilization. Because of this, a larger carrier, although able to transport a given number of slabs in fewer trips, would require the use of greater space between stacks in the field storage yard necessitating the storage of a fewer number of stacks in a given yard.

OBJECTS AND SUMMARY OF THE INVENTION

It is a primary aim of the present invention to provide a large capacity slab carrier which is compact, narrow and has a low profile. It is a further object of this invention to provide a slab carrier of the above type with improved maneuverability. A related object is to provide a carrier which avoids tire scrubbing due to the use of tandem rear wheels.

To this end, there is provided a carrier for lifting and transporting a stack of steel slabs or the like, wherein the carrier includes a selfpropelled tractor and a trailer having a longitudinally extending frame supported in front by a tractor hitch and at the rear by a rear wheel assembly having at least two steerable tandemly arranged wheels on each side of the trailer. The carrier includes a plurality of tong arms extending downwardly from the trailer frame for gripping a stack of slabs, lift means for raising and lowering the trailer frame and gripping means relative to the tractor and the rear wheel assembly, and means for steering the tandemly arranged rear wheels in opposite directions.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a side elevation of the slab carrier of the present invention with a stack of slabs shown in broken lines lifted to the transport position;

FIG. 2 is a plan view of the slab carrier of FIG. 1;

FIG. 3 is a rear elevation of the slab carrier of FIG. 1;

FIG. 4 is a rear elevation similar to FIG. 3, but showing the range of tong arm travel; and FIG. 5 is an enlarged, fragmentary sectional view of the tong clamping means as seen substantially along line 5—5 in FIG. 1.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Turning to the drawings, there is shown in FIG. 1 a slab carrier 10 for lifting and transporting a stack of slabs 11 or the like. The carrier 10 includes a trailer 12 with a longitudinally extending main frame 13 connected by a hitch 14 to a suitable prime mover such as a selfpropelled two-wheeled tractor 15. The trailer 12 and tractor 15 are pivoted about a vertical axis 16 that passes close to the axis of the tractor ground wheels 17. A pair of steering actuators 18 interconnect the tractor 15 and trailer 12 for pivoting the tractor 15 and trailer 12 about the vertical axis 16.

The rear of the trailer main frame 13 is supported by a rear wheel assembly 20 including a pair of steerable first wheels 21 and a pair of steerable second wheels 22. The first and second wheels 21, 22 are tandemly arranged on each side of the trailer 12. Each of the rear wheels 21, 22 includes an axle and bearing (not shown) that is mounted on the lower end of a piston rod portion 23 of a vertically oriented hydraulic actuator 24 secured to the rear of the main frame 13. The piston rods 23 of the actuators 24 also serve as the steering kingpins for the wheels 21, 22, providing a vertical axis 25 about which the wheels 21, 22 are steered. A laterally projecting steering arm 26 is rigidly secured to each of the piston rods 23 above the wheels 21, 22.

As seen in FIG. 2, a transverse steering link 30 interconnects the steering arms 26 mounted on the first wheels 21. A similar transverse steering link 31 likewise interconnects the steering arms 26 mounted on each of the second wheels 22. To steer the first wheels 21 and the second wheels 22 in opposite directions, a hydraulic actuator 32 interconnects the steering arms 26 of the first wheel 21 and second wheel 22 on one side of the trailer 12. Preferably, a diagonal steering link 33 interconnects the arms 26 of the first wheel 21 on one side of the trailer and the second wheel 22 on the other side to provide for substantially equal turning of the first wheels 21 and the second wheels 22.

To effectuate steering the rear wheels 21, 22, the hydraulic actuator 32 is either extended or retracted from its neutral position as shown by solid lines in FIG. 2, and the steering links 30, 31 and 33 cooperate to provide for substantially equal and opposite turning of the pair of first wheels 21 and the pair of second wheels 22. The carrier 10 is maneuvered in tight places by steering the rear wheels 21, 22 of the trailer 12 and pivoting the tractor 15 relative to the trailer 12 about the vertical axis 16 by means of the steering actuators 18. It will be understood that the steering actuators 18, 32 are controlled by an operator in the cab of the tractor 15. To prevent the wheels 21, 22, when steered, from coming into contact with the slabs 11, a tire shield 34 is preferably mounted on the inboard side of each wheel 21, 22 of the rear wheel assembly 20.

Pursuant to the invention, two pairs of tong arms 40 are pivotally supported by the main frame 13 of the trailer 12. The center portion of each tong arm 40 is pivotally fixed between two downwardly extending lift brackets 41 by a pin 42. The lift brackets 41 are rigidly secured to the main frame 13. For the purpose of pivoting the lower ends of the tongs 40 together to grip a stack of slabs 11, and pivoting the tongs 40 apart to release the stack, a hydraulic actuator 43 pivotally interconnects the upper ends of the tong arms 40 of each pair. Each actuator 43 extends transversely through a cross tube 44 which passes through and reinforces the main frame 13. In this way, the tong arms 40, the actuators 43 and all related elements are located within the maximum vertical profile of the carrier 10 defined by the upper surface of the main frame 13.

To hold the lower ends of the tong arms 40 in spaced-apart relationship, such as for positioning the carrier 10 for picking up a stack of slabs 11, the hydraulic actuators 43 are retracted so that the tong arms 40 pivot on the pins 42, drawing the upper ends of the tong arms 40 together and the lower ends apart. The tong arms 40 are shown in dashed lines in FIG. 4 in this spaced-apart relationship, wherein it can be seen that the range of tong arm travel is completely within the transport width defined by the outer profiles of the rear wheels 21, 22. To engage the tong arms 40 with a stack of slabs 11, the hydraulic actuators 43 are extended. The gripping operation of the hydraulic actuators 43 is controlled by the operator in the cab of the tractor 15.

In order to lift a stack of slabs 11, the hydraulic actuators 43 are extended to cause the tong arms 40 to grip the stack 11, and the main frame 13 by which the tong arms 40 are supported is raised by extending the hydraulic actuators 24 associated with the rear wheels 21, 22 and a hydraulic actuator 45 associated with the hitch 14. The main frame 13 with tong arms 40 gripping a stack of slabs 11 in a raised position for transport is shown in FIGS. 1 and 3. As noted above, each hydraulic actuator 24 includes a piston rod 23 on which is fixed the axle of one of the rear wheels 21, 22. The hydraulic actuators 24 may be activated to extend the rods 23 with respect to their cylinder portions to raise the main frame 13 and the tong arms 40 to a transport position for movement of the carrier 10 and, conversely, may be activated to retract the rods 23 within the cylinders to lower the main frame 13 and the tong arms 40 to pick up or drop off a stack of slabs 11.

To maintain the slabs 11 in a horizontal attitude when the actuators 24 are extended to the transport position, the hitch 14 and the front end of the main frame 13 are similarly lifted by the hydraulic actuator 45 associated with the hitch 14. For this purpose, the actuator 45 extends and retracts in unison with the actuators 24 associated with the rear wheels 21, 22. The raising and lowering operation of the hydraulic actuators 24, 45 is controlled by the operator in the cab of the tractor 15.

In accordance with the invention, the slab carrier 10 has a low profile because none of the gripping and lifting elements extend above the upper surface of the main frame 13 as can be seen in FIG. 1. This enables the carrier 10 to operate in areas with very limited overhead height clearance. Moreover, the carrier 10 has a narrow transport width because narrow rear wheels 21, 22 are used in tandem form, and the tong arms 40 are longitudinally displaced from the rear wheels 21, 22 allowing the tong arms 40 to open wide to a position within the profiles of the rear wheels 21, 22 as seen in FIG. 4. This enables the carrier 10 to straddle and lift a stack of slabs 11 substantially as wide as the region defined by the inner profiles of the rear wheels 21, 22. Stated differently, the carrier transport width can be as narrow as the width of slabs intended to be carried plus twice the width of a rear wheel 21, 22. As such, stacks of slabs can be stored extremely close to one another in a field storage yard, thereby reducing the amount of yard space required to hold a given number of stacks.

In further keeping with the principal objects of the invention, the slab carrier 10 is quite maneuverable because of the steerability of the rear wheels 21, 22. In addition, the tire scrubbing normally associated with tandemly arranged wheels is alleviated by such feature.

We claim as our invention:

1. A heavy duty slab carrier comprising, in combination, a self-propelled tractor having a hitch and a trailer having a rear wheel assembly, said trailer including a longitudinally extending main frame pivotally supported by said tractor hitch and said rear wheel assembly, said main frame having an essentially unobstructed upper surface extending from adjacent said hitch to the rear end of the trailer and defining substantially uniformly the maximum vertical profile of the trailer, said main frame having a plurality of lift brackets depending therefrom, said rear wheel assembly including at least two wheels arranged in close fore and aft relation to each other with a space therebetween on each side of the trailer to straddle a stack of slabs, said rear wheels having inner and outer profiles respectively defining substantially the maximum slab straddle width and the maximum transport clearance width of the trailer, means including a plurality of tong arms pivotally mounted on said lift brackets and extending downwardly from said main frame for gripping a number of slabs, one of said tong arms being disposed in the space between said fore and aft wheels on each side of the trailer and pivotable to an open position substantially within the inner and outer profiles of said rear wheels, actuator means mounted on said main frame within said vertical profile of the trailer for urging said tong arms toward closed position, and lift means for raising and lowering said main trailer frame and said gripping means relative to the tractor and said rear wheel assembly.

2. A slab carrier as defined in claim 1 including a cross tube extending through and reinforcing said main frame and said actuator means is located within said cross tube.

3. A slab carrier as defined in claim 2 wherein said lift brackets are mounted in pairs on each side of said main frame adjacent the ends of said cross tube and the brackets of each pair are spaced apart substantially equal to the diameter of said tube.

4. A slab carrier as defined in claim 1 wherein one of said tong arms is located ahead of the front one of said fore and aft wheels on each side of the trailer and said actuator means is located within a cross tube extending through and reinforcing said main frame.

5. A slab carrier as defined in claim 1 wherein said rear wheels are steerable and means are provided for turning said fore and aft wheels one each side of the trailer in opposite directions, said steering means includes a hydraulic actuator interconnecting said fore and aft wheels on one side of said frame and transverse links interconnecting the wheels on opposite sides of said frame.

6. A slab carrier as defined in claim 1 wherein said lift means includes a first hydraulic lift actuator associated with said tractor hitch and a plurality of second hydraulic lift actuators, one being associated with each of said rear wheels.

7. A heavy duty slab carrier comprising, in combination, a self-propelled tractor having a steering hitch and a trailer having a steerable rear wheel assembly, said trailer including a longitudinally extending main frame pivotally supported by said tractor hitch and said rear wheel assembly, said main frame having an essentially unobstructed upper surface extending from adjacent said hitch to the rear end of the trailer and defining substantially uniformly the maximum vertical profile of the trailer, said rear wheel assembly including at least first and second wheels arranged in close fore and aft relation to each other with a space therebetween on each side of the trailer to straddle a stack of slabs, said rear wheels having inner and outer profiles respectively defining substantially the maximum slab straddle width and the maximum transport clearance width of the trailer, means including a plurality of tong arms pivotally mounted on and extending downwardly from said main frame for gripping a number of slabs, one of said tong arms being disposed in the space between said fore and aft wheels on each side of the trailer and pivotable to an open position substantially within the inner and outer profiles of said rear wheels, actuator means mounted on said main frame within said vertical profile of the trailer for urging said tong arms toward closed position, lift means for raising and lowering said main trailer frame and said gripping means relative to the tractor and said rear wheel assembly, and means for steering said rear wheels including hydraulic means for turning at least one set of said first and second wheels in opposite directions and transverse link means for turning both of said first wheels in the one direction and both of said second wheels in the other direction.

8. A slab carrier as defined in claim 7 wherein said rear wheel assembly includes a plurality of tire shields spaced from and substantially parallel to said inner profile of each of said rear wheels.

9. A slab carrier as defined in claim 7 wherein said lift means includes a first hydraulic lift actuator associated with said tractor steering hitch and a plurality of second hydraulic lift actuators, each being associated with one of said rear wheels serving as a kingpin therefor.

* * * * *